United States Patent [19]

Kataoka

[11] Patent Number: 4,657,367

[45] Date of Patent: Apr. 14, 1987

[54] ELECTRONIC FLASH APPARATUS

[75] Inventor: Hiroyuki Kataoka, Tokyo, Japan

[73] Assignee: Canon Kabushiki Kaisha

[21] Appl. No.: 759,908

[22] Filed: Jul. 29, 1985

[30] Foreign Application Priority Data

Aug. 6, 1984 [JP] Japan .................................. 59-163900

[51] Int. Cl.⁴ .............................................. G03B 15/05
[52] U.S. Cl. ..................................... 354/415; 354/423
[58] Field of Search ............... 354/415, 421, 422, 423, 354/145.1; 315/241 P

[56] References Cited

U.S. PATENT DOCUMENTS 4,465,353  8/1984  Yoshida et al. ...................... 354/423

FOREIGN PATENT DOCUMENTS 17428  1/1985  Japan ................................... 354/415

Primary Examiner—W. B. Perkey
Attorney, Agent, or Firm—Toren, McGeady and Goldberg

[57] ABSTRACT

An electronic flash apparatus having a first trigger circuit for causing a main light source to start firing, a first capacitor for firing the main light source, a second trigger circuit for causing a preliminary light source to start firing, a second capacitor for firing the preliminary light source, and a circuit for producing a trigger signal for preliminary lighting when a preliminary illumination is carried out, wherein the second capacitor is connected in common to the main and preliminary light sources, and there is provided a preliminary lighting changeover circuit responsive to selection of a bounced-flash mode for changing the application of the trigger signal from the second trigger circuit to the first trigger circuit.

11 Claims, 5 Drawing Figures

ELECTRONIC FLASH APPARATUS

BACKGROUND OF THE INVENTION

1. Field of the Invention

This invention relates to electronic flash apparatus for photography with a camera, and more particularly to improvements of the electronic flash apparatus capable of bounce lighting and having a preliminary light source from which a preliminary scene illumination can be produced.

2. Description of the Prior Art

It has already been known in the art to provide an electronic flash apparatus in which prior to making a flash exposure, a preliminary lighting is carried out, and a previous adjustment of the photographic condition based on the information obtained by such a preliminary scene illumination before a main flash lighting so as to get a proper exposure for a subject of principal photographic interest as it is actually illuminated by the adjusted main flash.

Among the known flash lighting methods, there is known one in which the flash lamp is not pointed directly to the subject but at, for example, a ceiling or wall from which the soft light is reflected to the subject, or the bounce flash.

Because the intensity of the light that falls on the subject depends largely on the reflectance of the surface from which the light bounces, as its value varies from situation to situation, it has been difficult to make a previous adjustment of the photographic condition based on the information obtained by the metering light before a flash exposure is actually made, for such an electronic flash apparatus that enables the exposure light source to be pointed at the ceiling, but that has its metering light source only directed to the subject.

To avoid this, there has been a previous proposal for putting the metering light source into the common casing of the exposure light source which casing is pivotal relative to the main body so that when to make a bounced-flash exposure, the metering light is also made bounced to form an automatic adjustment of the photographic condition, for example, the aperture, in accordance with the level of reflection of the metering light as disclosed in U.S. Pat. No. 4,465,353 (issued Aug. 14, 1984). This prior known apparatus has, however, a problem that the size of the casing containing both of the light sources becomes very large, and the production cost is also increased.

SUMMARY OF THE INVENTION

A first object of the present invention is to eliminate the above-described problem and to provide an electronic flash apparatus capable of computing a bounced-flash exposure value based on the preliminary scene illumination, while still permitting a minimization of the size and a reduction of the cost to be achieved.

Under such a first object, a preliminary light source is made fixed in orientation and a main light source only is made pivotal relative to the main body, but when in the bounced-flash exposure mode, prior to actually making an exposure, instead of the preliminary light source, the main light source is fired to perform a preliminary scene illumination.

A second object of the invention is, therefore, to provide an electronic flash apparatus whose main light source is made usable as either one of the exposure and metering light sources.

Under such a second object, besides the first storage capacitor for the main light source, use is made of a second storage capacitor connected to both of the main and preliminary light sources in combination with means for transferring an actuating signal for preliminary lighting from entering the second trigger means for firing the preliminary light source to entering the first trigger means for firing the main light source when the bounced-flash exposure mode is selected.

A third object of the invention is therefore, to provide an electronic flash apparatus in which in the bounced-flash exposure mode, the intensity of the flash light from the main light source is changed to a value suited for preliminary scene illumination as depending upon the full charge on the second capacitor.

DETAILED DESCRIPTION OF THE PREFERRED EMBODIMENT

The present invention will next be described in detail in connection with an embodiment thereof by reference to the drawings.

Figure 1:
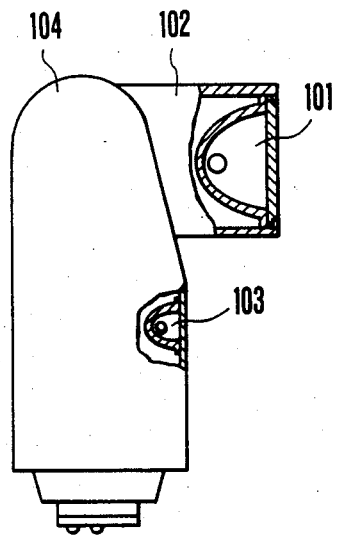
FIGS. 1 and 2 are side elevational views of an embodiment of an electronic flash apparatus according to the present invention with two portions broken away to illustrate two light sources in the normal flash and a bounce flash positions respectively.
Figure 2:
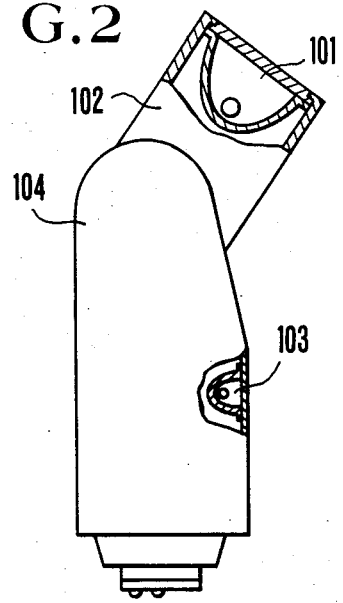

In FIGS. 1 and 2, a main light source 101 in the form of a flash discharge tube (to be described later) is housed in a head 102 pivotal relative to a body 104 containing a preliminary light source 103 in the form of a flash discharge tube (also to be described later). An infrared filter lies in front of the preliminary light source 103 in order to insure that when illuminated with the preliminary light, a person to be photographed does not shut his eyes at the brilliant light.

Figure 3:
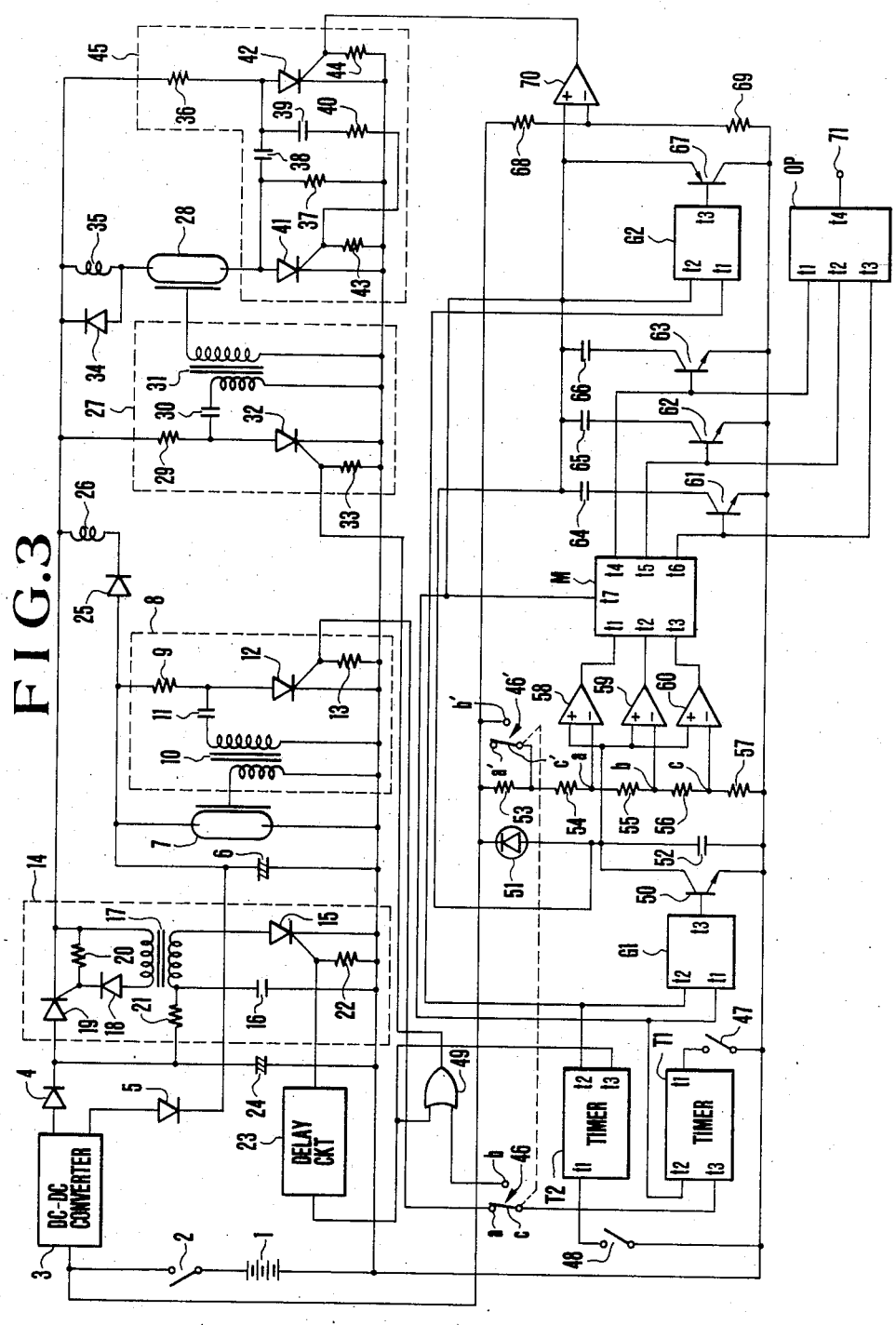
FIG. 3 is an electrical circuit diagram of the apparatus of FIGS. 1 and 2.

The circuit of FIG. 3 includes an electrical power source or battery 1, a power switch 2, a DC—DC converter for boosting the voltage of the battery 1, diodes 4 and 5, a storage capacitor of small capacitance 6, connected across both of a first flash discharge tube 7 for preliminary scene illumination and a second flash discharge tube 28, a trigger circuit 8 comprising a resistor 9, a transformer 10, a capacitor 11, a thyristor 12 and resistor 13, a switching circuit 14 comprising a thyristor 15, a capacitor 16, a pulse transformer 17, a diode 18, another thyristor 19 and resistors 20, 21 and 22, a delay circuit 23 for turning on the thyristor 15 in a prescribed time from the moment at which a synchro contact 48 was closed, another storage capacitor of large capacitance for the second discharge tube 28, a diode 25, an inductance 26 for moderating the ramp of firing of the second flashtube 28, that is, preventing the amount of flash emitted from increasing rapidly when the charge on the first capacitor 6 is discharged through that flash tube 28, another trigger circuit 27 for the second flashtube 28 comprising a resistor 29, a capacitor 30, a transformer 31, a thyristor 32 and another resistor 33, a diode 34 connected in series to the second flashtube 28 in a reverse direction and connected in parallel to another inductance 35, charging resistors 36 and 37 for a commutation capacitor 38, another capacitor 39 connected through a resistor 40 to the gate of a main thyristor 41, an auxiliary thyristor 42, resistors 43 and 44, a light amount control circuit 45.

Mode selector switches 46 and 46' have their movable contacts c and c' in "a" and "a'" positions respectively when in the normal flash exposure mode, and move to "b" and "b'" positions when the mode is changed over to the bounced-flash exposure mode. A switch 47 closes when a shutter release button is pushed down to a first stroke. The synchronizing switch 48 turns on in synchronism with the shutter release.

The circuit of FIG. 3 further includes an OR gate 49, a timer circuit T1 for preliminary lighting, another timer circuit T2 for main lighting, a gate circuit G1 responsive to a signal of high level from the first or second timer circuit T1 or T2 for turning off a transistor 50, a photosensitive element 51 positioned to receive light from an object to be photographed, an integration capacitor 52 on which photo current from the photosensitive element 51 is accumulated, a voltage divider of resistors 53 to 57, comparators 58 to 60, a memory circuit M, transistors t1 to 63, another integration capacitors 64 to 66, another gate circuit G2 for producing an output by which a transistor 67 is turned off, a voltage divider of resistors 68 and 69, another comparator 70, an aperture control signal forming circuit OP, and an outlet 71 from which an aperture control signal is transferred to the camera.

The operation is next be described. With the head 102 oriented directly to the object to be photographed (in the position of FIG. 1), the mode selector switch 46 takes the position of FIG. 3 where the pole "c" is in contact with the throw "a" thereby the normal exposure mode is selected. When the power switch 2 is turned on, the capacitor 6 is charged by the DC—DC converter 3 to a voltage high enough to fire the flashtube 7 for preliminary lighting. Then when the switch 47 turns on, the timer circuit T1 produces output signal of high level at the respective terminals t2 and t3 for prescribed times. Responsive to the signal t3, the first trigger circuit 8 actuates the first discharge tube 7 to fire, starting a preliminary scene illumination. Meanwhile, the other signal t2 is applied to the input terminal t1 of the gate circuit G1 and this gate circuit G1 produces an output signal of low level which is then applied to turn off the transistor 50, thereby the integration capacitor 52 is enabled to store electrical charge. The photosensitive element 51 transduces the reflected light from the object to current flowing to the integration capacitor 52. The voltage stored on the integration capacitor 52 takes a value proportional to the amount of incident light integrated. The potentials at the taps "a" to "c" of the voltage divider of resistors 54 to 57 have different values from each other in correspondence to the near, intermediate and far regions of a range of object distances. For example, with the object in the far region, at a time when the preliminary scene illumination has terminated, the voltage on the integration capacitor 52 takes a value higher than the potential at the tap "c", but lower than the potential at the tap "b". In this instance, therefore, the comparator 60 only produces an output signal of high level. Also, for the intermediate region, the comparators 59 and 60 each produce an output signal of high level, and for the near region, all the comparators 58 to 60 produce output signals of high level. In a prescribed time, the output at the terminal t2 of the timer circuit T1 for preliminary lighting changes to low level. Upon application of this signal to the terminal t7 of the memory circuit M, it memorizes the concurrent inputs at the terminals t1 to t3 thereof and selects one of the transistors 61 to 63 to turn on depending on the input information. For example, if the outputs of the comparators 58 to 60 all are high level, the transistor 63 is turned on to select the integration capacitor 66 for the near region. Also, responsive to conduction of either one for the transistors 61 to 63, the circuit OP produces an aperture control signal which is sent past the outlet 71 to the camera so that the size of aperture opening of the diaphragm for the lens is adjusted in accordance with the object distance.

Then when the synchronizing switch 48 turns on, the second timer circuit T2 produces output signals of high level at the terminals t2 and t3 for predetermined times. Responsive to the high level signal from the terminal t3, the OR gate 49 changes its output to high level, actuating the trigger circuit 27. Thus, the flash discharge tube 28 starts to fire with supply of electrical energy from the first storage capacitor 6. In the prescribed time from the application of that signal t3 to its input, the delay circuit 23 actuates the switching circuit 14, thereby the thyristor 19 is turned on. Thus, the electrical charge on the second storage capacitor 24 is discharged through the flash tube 28 (with the addition of electrical charge from the first storage capacitor 6). The reason why the exposure lighting is initiated not by the main or second storage capacitor 24 but by the first storage capacitor 6 of small capacitance is that the ramp of firing of the flash tube 28 is so moderated with the help of the inductance 26 that an overexposure which would be otherwise made when the object is at the near region can be prevented.

Meanwhile, when the high level signal from the terminal t2 of the second timer T2 is applied to its input terminal t1, the gate circuit G2 produces an output signal of low level at the terminal t3 which is applied to turn off the transistor 67, thereby the one of the integration capacitors 64 to 66 which has been selected by the memory circuit M is enabled to accumulate the photo current from the element 51, as the object is illuminated with the light from the fixed flash tube 28. When the voltage on the selected one of the integration capacitors 64 to 66 reaches a level determined by the voltage divider of resistors 68 and 69, the comparator 70 produces a de-actuating signal which is applied to turn on the auxiliary thyristor 42, thereby the main thyristor 41 is reverse-biased by the electrical charge on the commutation capacitor 38. Thus, the flash tube 28 squelches.

It is to be noted that because the terminal t2 of the second timer circuit T2 is connected to the terminal t2 of the first gate circuit G1, the production of the signal t2 of high level turns off the transistor 50 to allow for the integration capacitor 52 to be charged with current from the photosensitive element 51, but since the capacitance of that integration capacitor 52 is far smaller than that of each of the integration capacitors 64 to 66 the loss of that part of the photo current which is used up to charge the integration capacitor 52 may be neglected.

When the head 102 is pointed upward for the bounced-flash exposure mode (in the position of FIG. 2), the switches 46 and 46' are changed over so that the poles "c" and "c'" are in contact with the throws "b" and "b'" respectively. It is in the bounced-flash exposure mode that the triggering signal produced at the output terminal t3 of the preliminary lighting control timer circuit T1 is routed through the c-b path of the mode selector switch 46 and the OR gate 49 to the thyristor 32 of the second trigger circuit 27, thereby the second flash discharge tube 28 is fired with supply of electrical energy from the first storage capacitor 6. Thus, a preliminary lighting starts. Similarly to the normal flash exposure mode, an aperture control signal is then sent from the circuit OP to the camera. For note, whilst, in the normal flash exposure mode, the preliminary lighting is an infrared light, it is in the bounced-flash exposure mode that the main lighting source is used for producing a preliminary lighting which is visible to the person to be photographed. But, because the bounced flash from the wall or the like is a soft light, he when preliminarily illuminated can keep his eyes open in most of the photographic situation.

The significance of the use of another switch 46' is explained below. In the bounced-flash exposure mode, the resistor 53 is short-circuited by the "c'-b'" path of the switch 46' so that all the potentials at the inverting input terminals of the comparators 58 to 60 are higher than when in the normal flash exposure mode.

Meanwhile, though, in the bounced-flash exposure mode, the storage capacitor 6 for preliminary lighting is made cooperative with the exposure lighting source or flash tube 28 having no infrared filter in front thereof, an equal electrical energy to that when in the normal flash mode is stored on that storage capacitor 6 even when in the bounced-flash mode. Therefore, the intensity of the preliminary flash becomes higher than when in the normal flash mode. As a result, the amount of light received by the photosensitive element 51 increases, causing its output to represent an erroneous object distance.

According to the invention, however, this error is compensated for by increasing the potentials at the inverting input terminals of the comparators 58 to 60 as has been stated above. It is also to be noted that determination of a value of the resistor 53 should be made based on all of the difference in shape between the reflectors for the flash tubes 7 and 28, the difference between their flash efficiencies, and the loss by the coil 26 when it is desired to attain best results.

Then, when the synchronizing switch 48 closes, the main lighting control timer circuit T2 produces an output signal of high level at the terminal t2 which is applied through the OR gate 49 to the trigger circuit 27 and also directly to the delay circuit 23. The subsequent operation is similar to that described in connection with the normal flash mode, and, therefore, is omitted to explain here.

It will be appreciated that the present invention is to provide an electronic flash apparatus which, when switched to the bounced-flash mode, forms a preliminary lighting by having recourse to the main lighting source 101. Accordingly, there is no need to construct the apparatus in such a form that the preliminary lighting source is able to change its orientation to the same direction as that of the main lighting source, but in the form that the main lighting source 101 alone can change its orientation, (see FIG. 2), thereby giving an advantage that the size of the apparatus is reduced and the production cost is lowered.

Figure 4:
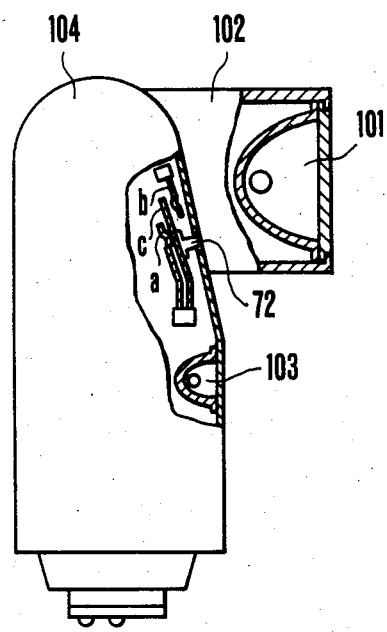
FIGS. 4 and 5 are side elevational views of the switch of FIG. 3 in different operative positions.
Figure 5:
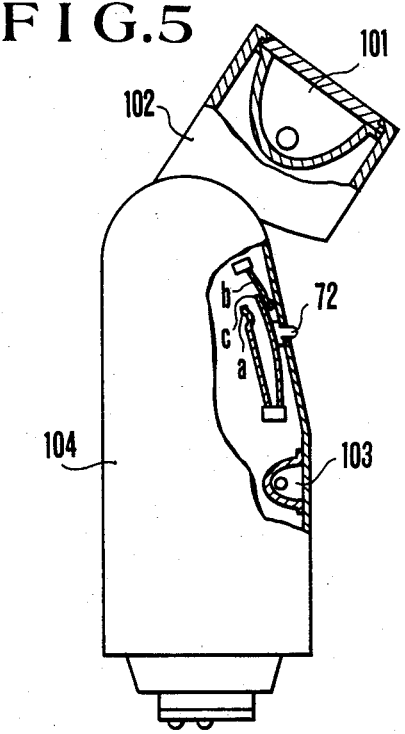

A practical example of arrangement of the mode selector switch 46 of FIG. 3 is shown in FIGS. 4 and 5 similar to FIGS. 1 and 2 except that the structure of construction of the contacts "a", "b" and "c" of FIG. 3 are illustrated along with a knob 72 as the actuator therefor. When the head 102 containing the main light source 101 turns upward, the knob 72 is no longer depressed, allowing the contact "c" to move away from the contact "a" by itself and come to contact with the contact "b", as shown in FIG. 5. When the head 102 is turned back to the position of FIG. 4, it pushes down the knob 72, thereby the contact "c" is taken out of contact with the contact "a" and brought into contact with the contact "b".

It should be noticed that the trigger circuit 27 in the embodiment corresponds to the first trigger means of the invention, the capacitor 24 to the first capacitor, the trigger circuit 8 to the second trigger means, the capacitor 6 to the second capacitor, the timer circuit T1 to the preliminary flash trigger signal forming means, and the selector switch 46 and OR gate 49 to the preliminary flash changeover means.

As has been described above, according to the present invention, the second capacitor is connected in common to the main light source and the preliminary light source, and when the bounced-flash mode is selected, the preliminary flash changeover means causes the preliminary flash trigger signal to enter the first trigger means instead of the second trigger means, whereby when in the bounced-flash mode, the main light source is made to also serve as a preliminary light source cooperative with the second capacitor. Therefore, it is made possible to achieve a minimization of the size and cost.

What is claimed is:

1. An electronic flash apparatus for carrying out preliminary illumination to determine photographic condition for flash photography prior to making up an exposure and a main illumination for making up the exposure, comprising:
   (a) a first light source displaceably mounted on a body of said flash apparatus;
   (b) a second light source undisplaceably mounted on the body;
   (c) control means operating in such a manner that when said first light source is not displaced, the preliminary illumination is carried out by firing said second light source, and the main illumination is carried out by firing said first light source, and when said first light source is displaced, the preliminary illumination and the main illumination are carried out by said first light source.

2. An electronic flash apparatus of claim 1, wherein said control means includes:
   (a) discriminating means assuming a first state when said first light source is not displaced, and a second state when displaced; and
   (b) control means operating in such a manner that when said discriminating means is in the first state, the preliminary illumination is carried out by firing said second light source and the main illumination is carried out by firing said first light source, and when in the second state, both of the preliminary illumination and the main illumination are carried out by firing said first light source.

3. An apparatus for carrying out preliminary illumination to determine an aperture value for flash photography prior to making up an exposure and a main illumination for making up the exposure, comprising:
   (a) a first light source displaceably mounted on a body of said apparatus;
   (b) a second light source undisplaceably mounted on the body;

(c) determining means for detecting the reflected light level of an object to be photographed when a preliminary illumination is carried out and determining an aperture value for flash photography; and (d) control means operating in such a manner that when said first light source is not displaced, the preliminary illumination is carried out by firing said second light source, and the main illumination is carried out by firing said first light source, and when said first light source is displaced, the preliminary illumination and the main illumination are carried out by said first light source.

4. an apparatus of claim 3 wherein said control means includes:

(a) discriminating means assuming a first state when said first light source is not displaced, and a second state when displaced; and (b) control means operating in such a manner that when said discriminating means is in the first state, the preliminary illumination is carried out by firing said second light source and the main illumination is carried out by firing said first light source, and when in the second state, both of the preliminary illumination and the main illumination are carried out by firing said first light source.

5. An apparatus of claim 3, further comprising:

(a) a capacitor for storing electrical energy for carrying out the preliminary illumination.

6. An apparatus of claim 5, wherein said first light source and said second light source have different light characteristics from each other, and said determining means has means for compensating for such a difference of the light characteristics when in determining the aperture value.

7. An apparatus of claim 5, wherein said first light source produces a visible light, and said second light source produces an infrared light.

8. An apparatus of claim 7, wherein said determining means makes determination of the aperture value with a correction factor depending on the difference between the diffusion coefficients of said visible light and said infrared light, as said first light source is displaced, or no displaced.

9. An apparatus for carrying out preliminary illumination to determine photographic condition for flash photography prior to making up an exposure and a main illumination for making up the exposure comprising:

(a) a first light source displaceably mounted on a body of said apparatus;

(b) a second light source undisplaceably mounted on the body;

(c) a capacitor for storing electrical energy for carrying out the preliminary illumination;

(d) discriminating means assuming a first state when said first light source is not displaced, and a second state when displaced; and (e) control means responsive to that said discrimating means is in the first state for supplying the electrical energy stored on said capacitor to said second light source to carry out the preliminary illumination, and responsive to that said discriminating means is in the second state for supplying the electrical energy stored on said capacitor to said first light source to carry out the preliminary illumination.

10. An apparatus of one of claims 1 to 9, wherein when said first light source is displaced, its target area does not coincide with that of said second light source.

11. An apparatus of claim 10, further comprising:

(a) another capacitor for storing electrical energy for carrying out the main illumination; and (b) means for giving said first light source electrical energy from said another capacitor when the main illumination is carried out.

* * * * *